(12) United States Patent
Masubuchi

(10) Patent No.: US 12,515,556 B2
(45) Date of Patent: Jan. 6, 2026

(54) OPERATION MANAGEMENT APPARATUS OF MOVING BODY

(71) Applicant: HONDA MOTOR CO., LTD., Tokyo (JP)

(72) Inventor: Takehito Masubuchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 18/439,969

(22) Filed: Feb. 13, 2024

(65) Prior Publication Data

US 2024/0270116 A1    Aug. 15, 2024

(30) Foreign Application Priority Data

Feb. 14, 2023    (JP) .................................. 2023-021091

(51) Int. Cl.
*B60L 58/12*    (2019.01)
*B60L 1/00*    (2006.01)
*G06F 3/01*    (2006.01)

(52) U.S. Cl.
CPC .............. *B60L 58/12* (2019.02); *G06F 3/011* (2013.01); *B60L 1/00* (2013.01); *B60L 2250/16* (2013.01)

(58) Field of Classification Search
CPC ........ B60L 58/12; B60L 1/00; B60L 2250/16; G06F 3/011; G06T 19/006
See application file for complete search history.

(56) References Cited

FOREIGN PATENT DOCUMENTS

JP    2017-102401 A    6/2017

*Primary Examiner* — Alan D Hutchinson
(74) *Attorney, Agent, or Firm* — Rankin, Hill & Clark LLP

(57) ABSTRACT

The operation management apparatus of a moving body is included in a virtual space production apparatus that includes an AV device configured to provide AV information to an occupant of the moving body, an SUS actuator configured to generate load relating to vibration of the moving body, and a VR controller configured to control the AV device and the SUS actuator and that produces a simulated experience for the occupant in a virtual space by driving the AV device and the SUS actuator when a VR service according to VR contents is enjoyed by using the moving body in a stopped state. The VR controller presents operation management information relating to a remaining charge of a battery and a travelable distance after enjoying of the VR service according to the VR contents, on an LCD prior to the enjoying of the VR service.

4 Claims, 7 Drawing Sheets

FIG. 5A

| PRODUCTION INTENSITY | OUTPUT RATIO |
|---|---|
| HARD | 1.3 |
| NORMAL | 1 |
| SOFT | 0.7 |

FIG. 5B

| ITEM | OPERATION MANAGEMENT INFORMATION | | |
|---|---|---|---|
| | SOFT | NORMAL | HARD |
| POWER CONSUMPTION AMOUNT (IN TERMS OF SOC) WITH ENJOYING OF VR SERVICE | 31.5% | 45.0% | 58.5% |
| STANDARD SERVICE TIME | 90 MINUTES | | |
| SOC BEFORE ENJOYING | 55% | | |
| SOC AFTER ENJOYING | 23.5% | 10.0% | 3.5% |
| AVERAGE TRAVEL DISTANCE PER UNIT SOC | 2 km/% | | |
| TRAVELABLE DISTANCE AFTER ENJOYING | 47km | 20km | 0km |
| EXPECTED TRAVEL DISTANCE AFTER ENJOYING | 35km | | |
| VR SERVICE PROVIDABLE/NOT-PROVIDABLE DETERMINATION RESULT | PROVIDABLE | NOT PROVIDABLE | NOT PROVIDABLE |

FIG. 5C

| ITEM | OPERATION MANAGEMENT INFORMATION | | |
|---|---|---|---|
| | SOFT | NORMAL | HARD |
| AVERAGE POWER CONSUMPTION AMOUNT (IN TERMS OF SOC) PER UNIT TIME | 0.35% PER MINUTE | 0.50% PER MINUTE | 0.65% PER MINUTE |
| EXPECTED PLAY TIME | 30 MINUTES | | |
| EXPECTED POWER CONSUMPTION AMOUNT (IN TERMS OF SOC) | 10.5% | 15.0% | 19.5% |
| SOC BEFORE ENJOYING | 55% | | |
| SOC AFTER ENJOYING | 44.5% | 40.0% | 35.5% |
| AVERAGE TRAVEL DISTANCE PER UNIT SOC | 2 km/% | | |
| TRAVELABLE DISTANCE AFTER ENJOYING | 89km | 80km | 71km |
| EXPECTED TRAVEL DISTANCE AFTER ENJOYING | 75km | | |
| VR SERVICE PROVIDABLE/NOT-PROVIDABLE DETERMINATION RESULT | PROVIDABLE | PROVIDABLE | NOT PROVIDABLE |

OPERATION MANAGEMENT APPARATUS OF MOVING BODY

CROSS-REFERENCE TO RELATED APPLICATION

This application is based upon and claims priority from the Japanese Patent Application No. 2023-021091, filed on Feb. 14, 2023, the entire contents of which are incorporated herein by reference.

BACKGROUND OF THE INVENTION

1. Field of the Invention

The present invention relates to an operation management apparatus of a moving body including a virtual space production apparatus configured to build a virtual space in a cabin of a moving body such as a vehicle to produce a simulated experience for an occupant.

2. Description of the Related Art

Conventionally, there is known a technique in which a virtual space is built in a vehicle cabin by using the vehicle as a motion platform to produce a simulated experience for an occupant (see, for example, JP2017-102401A).

A virtual reality system according to JP2017-102401A includes video presenting means for presenting a video to a user based on video information expressing the virtual space and controlling means for controlling acceleration and deceleration of the vehicle by using a drive pattern that causes the vehicle to move, then stop, and return to the original position such that sense or motion corresponding to the video information expressing the virtual space is presented.

According to the virtual reality system in JP2017-102401A, the sense or motion corresponding to the video information can be presented to the user by using the vehicle as the motion platform.

SUMMARY OF THE INVENTION

However, in the virtual reality system according to JP2017-102401A, for example, when the user enjoys a virtual reality (hereinafter, abbreviated as VR in some cases) service in which sense or motion according to VR contents is presented to the user in the virtual space built in the vehicle cabin by using the stopped vehicle as the motion platform, relatively large electric power corresponding to the VR service is consumed. Then, a remaining charge of a vehicle-mounted battery becomes low after the enjoying of the VR service according to the VR contents. As a result, there is a risk that this low remaining charge becomes a problem in an operation of the vehicle in, for example, a return route.

The present invention has been made in view of the above circumstances, and an object is to provide an operation management apparatus of a moving body such as a vehicle that can guarantee appropriate operation management of the moving body in enjoying of a VR service according to VR contents in the moving body.

In order to achieve the above object, an operation management apparatus of a moving body according to the present invention is an operation management apparatus of a moving body including a virtual space production apparatus including an audio visual (AV) device configured to present AV information to an occupant of the moving body, an actuator configured to generate load relating to vibration of the moving body, and a controller configured to control the AV device and the actuator, the virtual space production apparatus configured to produce a simulated experience for the occupant in a virtual space by driving the AV device and the actuator when a virtual reality (VR) service according to VR contents is enjoyed by using the moving body in a stopped state, the moving body configured to use electric power of a chargeable and dischargeable battery as a power source, the operation management apparatus comprising: an information obtainer configured to obtain information on power consumption to be consumed with the enjoying of the VR service according to the VR contents, information on a state of charge of the battery before the enjoying of the VR service, and information on an electric milage of the moving body; and a calculator configured to calculate a remaining charge of the battery after the enjoying of the VR service based on the information on the power consumption to be consumed with the enjoying of the VR service and the information on the state of charge of the battery before the enjoying of the VR service and to calculate a travelable distance of the moving body after the enjoying of the VR service based on the calculated remaining charge of the battery and the electric milage of the moving body, wherein the controller presents operation management information relating to the remaining charge of the battery and the travelable distance after the enjoying of the VR service, on an information presenter prior to the enjoying of the VR service.

The present invention can guarantee appropriate operation management of a moving body such as a vehicle in enjoying of a VR service according to VR contents in the moving body.

BRIEF DESCRIPTION OF THE DRAWINGS

FIG. 5A is a diagram showing an example of an output ratio associated with each of multiple levels of production intensity set in the operation management apparatus of the moving body.

FIG. 5B is a diagram used to explain a presentation form relating to the operation management information for each of the multiple levels of production intensity, the operation management information presented in a form of a list prior to enjoying of a VR service according to VR contents (a movie or the like).

FIG. 5C is a diagram used to explain a presentation form relating to the operation management information for each of the multiple levels of production intensity, the operation management information presented in a form of a list prior to enjoying of a VR service according to VR contents (a game or the like).

DETAILED DESCRIPTION OF THE EMBODIMENTS

Figure 1:
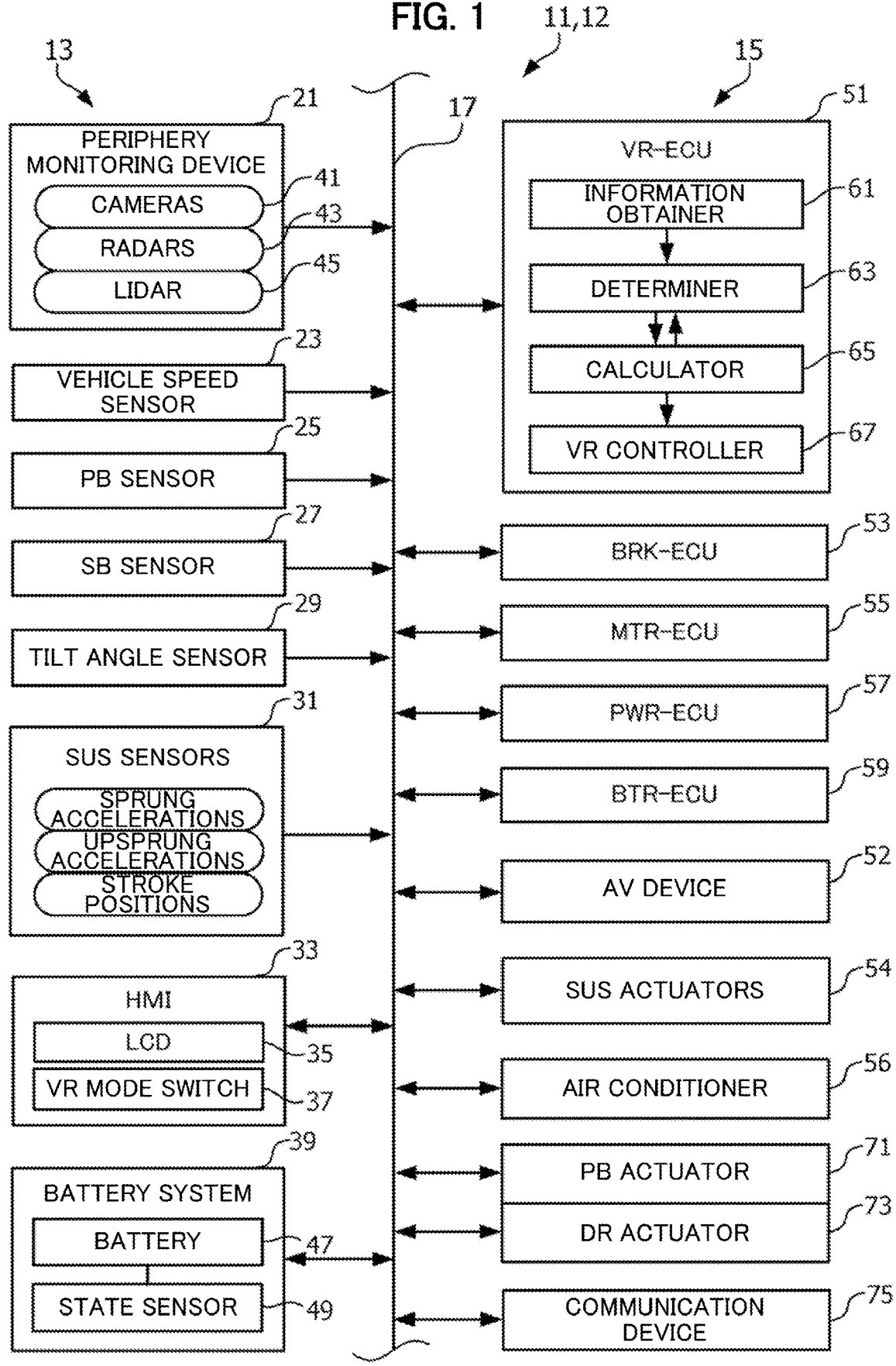
FIG. 1 is a schematic configuration diagram of a virtual space production apparatus also serving as an operation management apparatus of a moving body according to an embodiment of the present invention.

An operation management apparatus of a moving body according to an embodiment of the present invention is described below in detail with reference to the drawings as appropriate.

Note that, in the drawings described below, members with common functions are denoted by common reference numerals. In this case, overlapping description is omitted in principle. Moreover, the sizes and shapes of the members are sometimes schematically expressed in a deformed or exaggerated manner for the sake of explanation.

[Outline of Operation Management Apparatus 12 According to Embodiment of Present Invention]

First, an outline of the operation management apparatus 12 of the moving body according to the embodiment of the present invention is described.

The operation management apparatus 12 (see FIG. 1) of the moving body according to the embodiment of the present invention is assumed to be the operation management apparatus 12 of the moving body including a virtual space production apparatus 11 that includes: an audio visual (AV) device 52 (see FIG. 1) configured to present AV information to an occupant of the moving body such as a vehicle 10 (see FIG. 2); an actuator (see "SUS actuators 54" shown in FIG. 1) configured to generate load relating to vibration of the moving body; and a controller (see "VR controller 67" shown in FIG. 1) configured to control the AV device 52 and the SUS actuators 54 and that produces a simulated experience for the occupant in a virtual space by driving the AV device 52 and the SUS actuators 54 in enjoying of a virtual reality (VR) service according to VR contents achieved by using the moving body in a stopped state. The moving body is assumed to use electric power of a chargeable and dischargeable battery 47 as a power source.

The operation management apparatus 12 of the moving body includes an information obtainer 61 configured to obtain information on power consumption to be consumed with the enjoying of the VR service according to the VR contents, information on a state of charge of the battery 47 before the enjoying of the VR service, and information on an electric milage of the moving body and a calculator 65 configured to calculate a remaining charge of the battery 47 after the enjoying of the VR service based on the information on the power consumption to be consumed with the enjoying of the VR service and the information on the state of charge of the battery 47 before the enjoying of the VR service and to calculate a travelable distance of the moving body after the enjoying of the VR service based on the calculated remaining charge of the battery 47 and the electric milage of the moving body.

The VR controller 67 presents operation management information relating to the remaining charge of the battery 47 and the travelable distance after the enjoying of the VR service on an information presenter (see "LCD 35" shown in FIG. 1) prior to the enjoying of the VR service according to the VR contents.

Accordingly, when the occupant enjoys the VR service according to the VR contents in the moving body such as the vehicle 10, the case where the moving body becomes unmovable at a site where the VR service is enjoyed can be avoided in advance, and appropriate operation management of the moving body can be guaranteed in terms of this point.

Details of the operation management apparatus 12 of the moving body according to the embodiment of the present invention are described below one by one.

[Schematic Configuration of Operation Management Apparatus 12 of Moving Body According to Embodiment of Present Invention]

Figure 2:
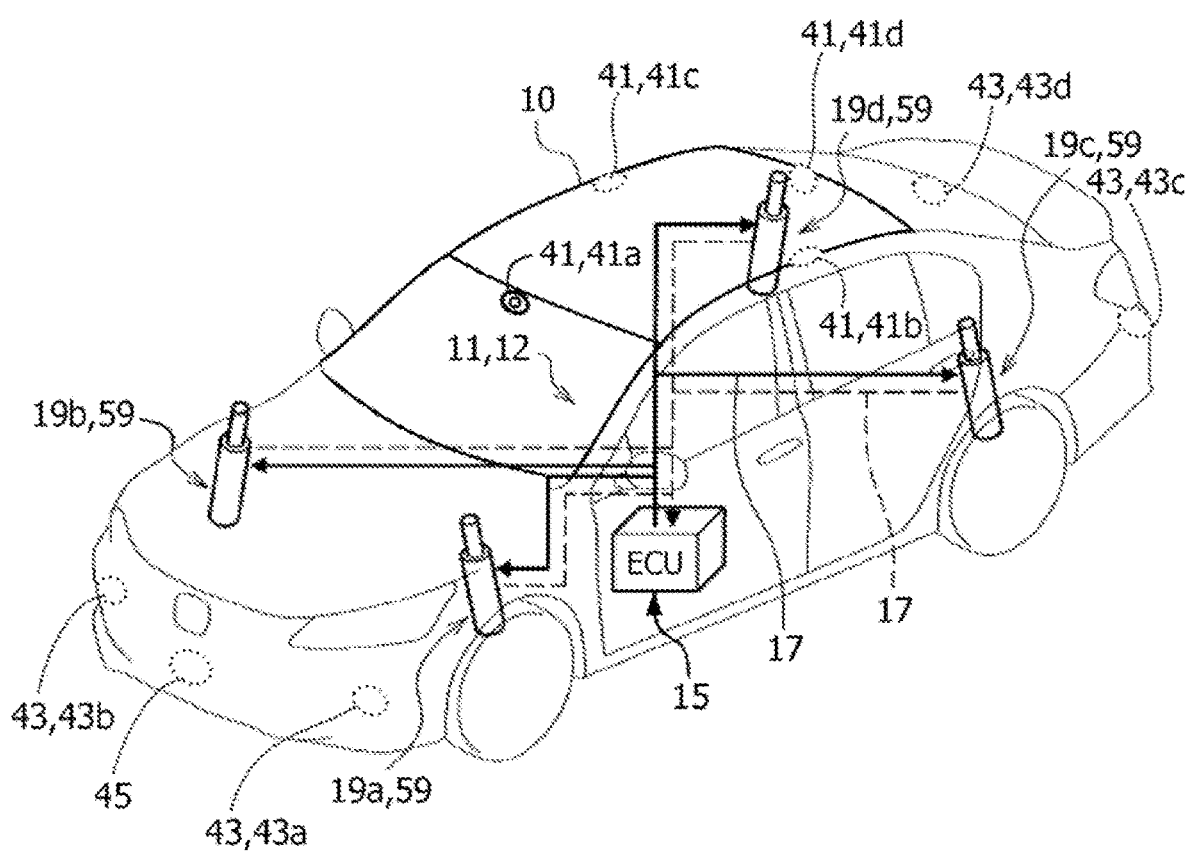
FIG. 2 is a schematic configuration diagram of a vehicle to which the virtual space production apparatus also serving as the operation management apparatus of the moving body is applied.
Figure 3A:
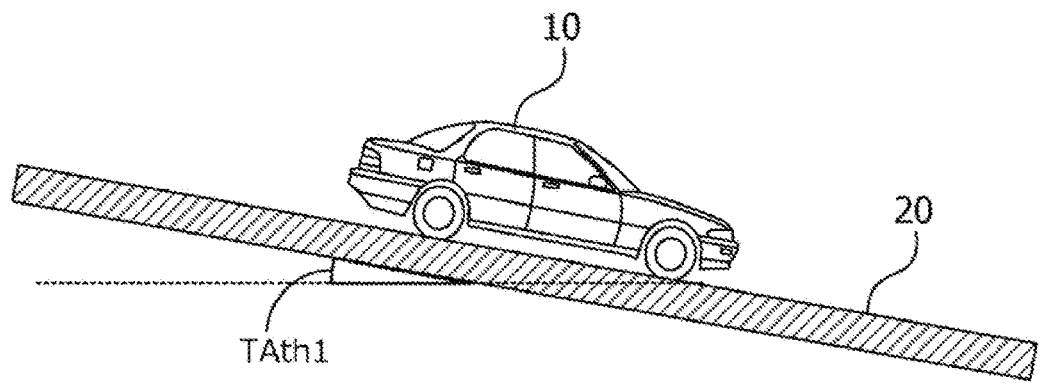
FIG. 3A is a diagram used to explain operations of the virtual space production apparatus in the case where the vehicle is parked on a tilted road.
Figure 3B:
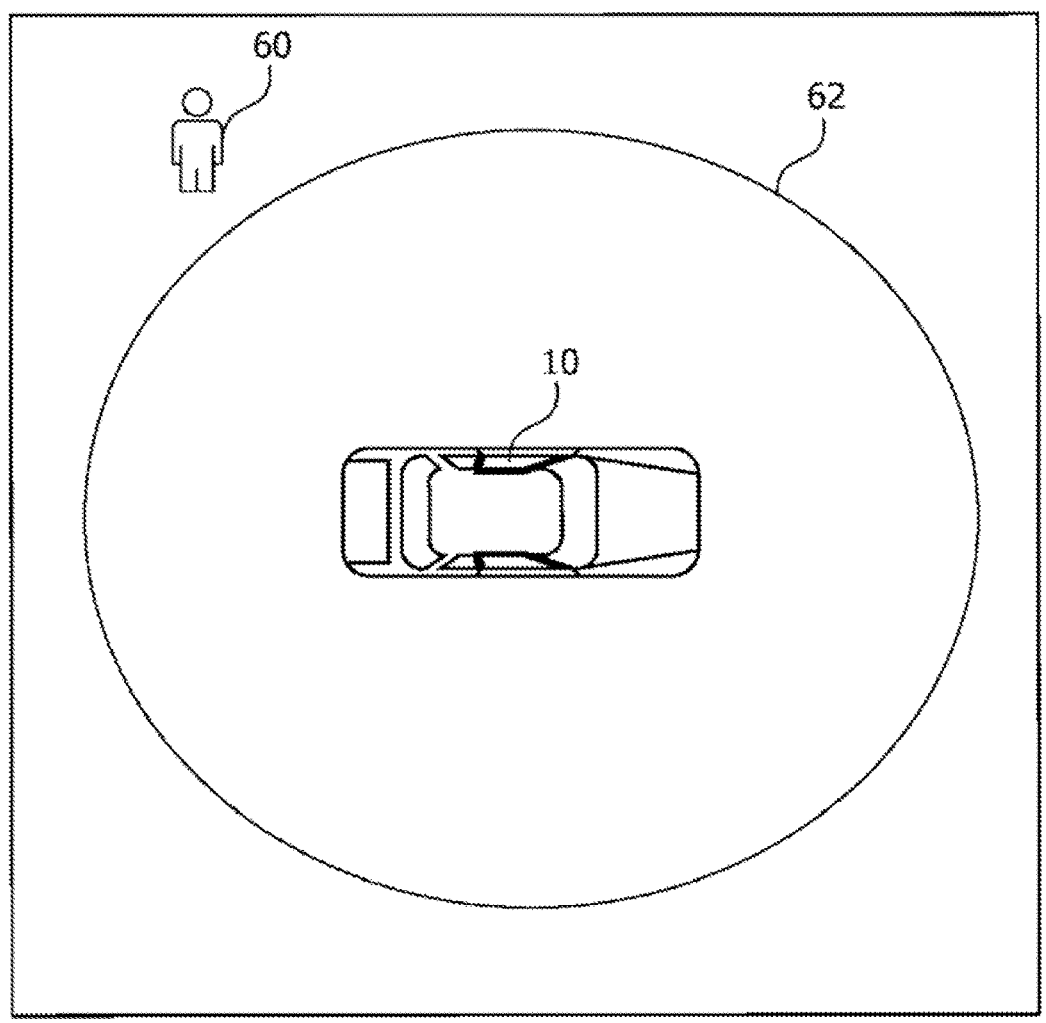
FIG. 3B is a diagram used to explain operations of the virtual space production apparatus in the case where a passerby is absent in a monitoring region of the vehicle.

Next, a schematic configuration of the operation management apparatus 12 of the moving body according to the embodiment of the present invention is described with reference to FIGS. 1, 2, 3A, and 3B as appropriate. FIG. 1 is a schematic configuration diagram of the virtual space production apparatus 11 also serving as the operation management apparatus 12 of the moving body according to the embodiment of the present invention. FIG. 2 is a schematic configuration diagram of the vehicle 10 to which the virtual space production apparatus 11 also serving as the operation management apparatus 12 of the moving body is applied. FIG. 3A is a diagram used to explain operations of the virtual space production apparatus 11 in the case where the vehicle 10 is parked on a tilted road 20. FIG. 3B is a diagram used to explain operations of the virtual space production apparatus 11 in the case where a passerby (object) 60 is absent in a monitoring region 62 of the vehicle 10.

As shown in FIGS. 1 and 2, the virtual space production apparatus 11 also serving as the operation management apparatus 12 of the moving body is configured such that input-system elements 13 and output-system elements 15 are connected to one another via a communication medium 17 such as, for example, a controller area network (CAN) to allow data communication.

As shown in FIG. 1, the input-system elements 13 includes a periphery monitoring device 21, a vehicle speed sensor 23, a parking brake (PB) sensor 25, a seatbelt (SB) sensor 27, a tilt angle sensor 29, suspension (SUS) sensors 31, a human-machine interface (HMI) 33, and a battery system 39.

Meanwhile, as shown in FIG. 1, the output-system elements 15 include a VR-ECU 51, a BRK-ECU 53, an MTR-ECU 55, a PWR-ECU 57, a BTR-ECU 59, the AV device 52, the suspension (SUS) actuators 54, an air conditioner 56, a PB actuator 71, a door lock (DR) actuator 73, and a communication device 75.

[Schematic Configuration of Input-System Elements 13]

The periphery monitoring device 21 belonging to the input-system elements 13 monitors presence or absence of the object 60 such as the passerby in the monitoring region (see refence numeral 62 shown in FIG. 3B) set in the periphery of the vehicle 10, and outputs presence-absence information relating to presence or absence of the passerby (object) 60 in the monitoring region 62. The presence-absence information of the passerby (object) 60 in the monitoring region 62 outputted by the periphery monitoring device 21 is sent to the VR-ECU 51 and the like via the communication medium 17.

Specifically, as shown in FIGS. 1 and 2, the periphery monitoring device 21 includes cameras 41, radars 43, and a lidar 45.

As shown in FIG. 2, the cameras 41 include a front camera 41a configured to monitor an area in front of the vehicle 10, paired side cameras 41b and 41c configured to monitor areas to the left and right of the vehicle 10, respectively, and a rear camera 41d configured to monitor an area behind the vehicle 10. The cameras 41 detect and output the presence-absence information of the passerby (object) 60 present in the periphery of the vehicle 10 through peripheral images of the vehicle 10.

As shown in FIG. 2, the radars 43 are provided at four corners of the vehicle 10, respectively, and detect and output the presence-absence information of the passerby (object) 60 for the respective corner areas.

As shown in FIG. 2, the lidar 45 is provided in a front and vehicle width direction center portion of the vehicle 10, and detects and outputs the presence-absence information of the passerby (object) 60 for the area in front of the vehicle 10.

The vehicle speed sensor 23 has a function of detecting traveling speed (vehicle speed) of the vehicle 10. Information relating to the vehicle speed detected by the vehicle speed sensor 23 is sent to the BRK-ECU 53 and the like via the communication medium 17.

The parking brake (PB) sensor 25 detects and outputs an on signal when a parking brake (PB) is activated. An on-off signal outputted by the PB sensor 25 is sent to the VR-ECU 51 and the like via the communication medium 17.

The seatbelt (SB) sensor 27 detects and outputs an on signal when a seatbelt (SB) relating to a seat on which the occupant seats is fastened. An on-off signal outputted by the SB sensor 27 is sent to the VR-ECU 51 and the like via the communication medium 17.

The tilt angle sensor 29 has a function of obtaining information relating to a tilt angle of the vehicle 10. The information relating to the tilt angle of the vehicle 10 obtained by the tilt angle sensor 29 is sent to the VR-ECU 51 and the like via the communication medium 17.

The SUS sensors 31 detect and output SUS information relating to expansion-contraction states of suspension devices 19 such as sprung accelerations, upsprung accelerations, and stroke positions that are physical quantities generated with expansion and contraction operations of the suspension devices 19. The SUS information relating to the expansion-contraction states of the suspension devices 19 outputted by the SUS sensors 31 is sent to the VR-ECU 51 and the like via the communication medium 17. The VR-ECU 51 refers to the SUS information when controlling the expansion-contraction states of the suspension devices 19.

The human-machine interface (HMI) 33 includes a VR mode switch 37 and the LCD 35 that is a liquid crystal display device. The LCD 35 corresponds to the "information presenter" of the present invention. The VR mode switch 37 is operated by an occupant when a virtual space is to be built in a vehicle cabin to enjoy the VR service. Operation information of the VR mode switch 37 is sent to the VR-ECU 51 and the like via the communication medium 17.

The battery system 39 includes the battery 47 that is a secondary cell such as a lithium-ion battery mounted in the vehicle 10 and a state sensor 49 that detects various pieces of data such as the state of charge of the battery 47. The battery 47 has, for example, a function of being charged with regenerative power in a regenerative operation of a drive motor (not shown) relating to drive wheels while discharging electric power in a power-running operation of the drive motor.]

In other words, the vehicle 10 corresponding to the moving body of the present invention travels by using the electric power of the chargeable and dischargeable battery 47, as a power source.

The state sensor 49 includes, for example, a current sensor, a voltage sensor, and a temperature sensor, and detects and outputs BTR state information that is state information of the battery 47 including a current value, a voltage value, and temperature of the battery 47. The BTR state information detected by the state sensor 49 is sent to the VR-ECU 51, the MTR-ECU 55, the PWR-ECU 57, the BTR-ECU 59, and the like via the communication medium 17.

[Schematic Configuration of Output-System Elements 15]

The VR-ECU 51 belonging to the output-system elements 15 performs control relating to the VR service using VR contents.

The VR-ECU 51 is formed of a microcomputer including a central processing unit (CPU), a read only memory (ROM), a random access memory (RAM), and the like. The microcomputer reads and executes programs and data stored in the ROM, and operates to perform control of executing various functions of the VR-ECU 51 including a function of obtaining various pieces of information, a determination function to be described next, a calculation function, a VR control function, and a function of presenting the operation management information relating to the vehicle 10.

For example, the VR-ECU 51 drives the AV device 52 and the SUS actuators 54 to reproduce a behavior and an engine sound of a kart running in a circuit or to present a video and an audio of a movie as the VR service using the VR contents. The VR contents may be, for example, downloaded in advance via the communication device 75, and stored in a memory such as the RAM included in the VR-ECU 51.

As shown in FIG. 1, the VR-ECU 51 includes the information obtainer 61, a determiner 63, the calculator 65, and the VR controller 67 such that the occupant can enjoy the VR service using the VR contents.

The information obtainer 61 obtains time-series information such as the presence-absence information of the passerby (object) 60 in the monitoring region 62 outputted by the periphery monitoring device 21, the information relating to the vehicle speed detected by the vehicle speed sensor 23, the activation information of the parking brake (PB) outputted by the PB sensor 25, the fastening information of the seatbelt (SB) outputted by the SB sensor 27, the tilt information relating to the tilt angle of the vehicle 10 outputted by the tilt angle sensor 29, the SUS information relating to the expansion-contraction states of the respective multiple suspension devices 19a, 19b, 19c, and 19d (hereinafter, collectively referred to as suspension devices 19 in some cases) outputted by the SUS sensors 31, the operation information of the VR mode switch 37, and the BTR state information outputted by the state sensor 49.

The information obtainer 61 also obtains the information on the power consumption to be consumed with the enjoying of the VR service according to the VR contents (see "power consumption amount (in terms of SOC) with enjoying of VR service" in FIG. 5B and "average power consumption amount (in terms of SOC) per unit time" in FIG. 5C), the information on the state of charge of the battery 47 before the enjoying of the VR service (see "SOC before enjoying" in FIGS. 5B and 5C), and the information on the electric milage of the vehicle (moving body) 10 (see "average travel distance per unit SOC" in each of FIGS. 5B and 5C) as various pieces of information on the operation management of the vehicle 10.

Moreover, the information obtainer 61 obtains setting information of a production intensity relating to a drive range that is a setting width of drive force of the SUS actuators 54 (see FIG. 5A) and information on adjusted power consumption to be consumed in enjoying of an adjusted VR service in which the drive range of the SUS actuators 54 is adjusted by applying the drive range based on the setting information of the production intensity (see "power consumption amount (in terms of SOC) with enjoying of VR service" in FIG. 5B and "average power consumption amount (in terms of SOC) per unit time" in FIG. 5C) as the various pieces of information on the operation management of the vehicle 10.

Note that the various pieces of information on the operation management of the vehicle 10 described above may be, for example, stored in advance in a memory included in the VR-ECU 51 or obtained by, for example, being downloaded as necessary from an external database (not shown) in which the operation management information of the vehicle 10 is stored for each type vehicle via the communication device 75.

Various pieces of information including the presence-absence information of the object in the monitoring region 62, the information relating to the vehicle speed, the activation information of the parking brake (PB), the fastening information of the seatbelt (SB), the tilt information relating to the tilt angle of the vehicle 10, the SUS information, the operation information of the VR mode switch 37, the BTR state information outputted by the state sensor 49, and the various pieces of information on the operation management of the vehicle 10 obtained by the information obtainer 61 are sent to the determiner 63, the calculator 65, the VR controller 67, and the like.

The determiner 63 determines whether the vehicle 10 is in a tilted state in which the tilt angle TA of the vehicle 10 exceeds a predetermined first tilt angle threshold TAth1, based on the tilt information relating to the tilt angle TA of the vehicle 10 and obtained by the information obtainer 61.

Moreover, the determiner 63 determines whether the passerby (object) 60 is present in the monitoring region 62, based on the monitoring information obtained by the information obtainer 61.

Furthermore, the determiner 63 determines whether the vehicle (moving body) 10 can complete an expected travel distance set in advance, based on the travelable distance calculated by the calculator 65 to be described next and the expected travel distance.

The determination results of the determiner 63 are sent to the VR controller 67.

The calculator 65 basically calculates the remaining charge of the battery 47 after the enjoying of the VR service according to the VR contents based on the information on the power consumption to be consumed with the enjoying of the VR service and the information on the state of charge of the battery 47 before the enjoying of the VR service, and calculates the travelable distance of the vehicle (moving body) 10 after the enjoying of the VR service based on the calculated remaining charge of the battery 47 and the electric milage of the vehicle (moving body) 10.

Moreover, the calculator 65 calculates the remaining charge of the battery 47 after the enjoying of the adjusted VR service for each of multiple levels of production intensity based on information on the adjusted power consumption for the each of the multiple levels of production intensity and the information on the state of charge of the battery 47 before the enjoying of the VR service, and calculates the travelable distance of the vehicle (moving body) 10 after the enjoying of the adjusted VR service for each of the multiple levels of production intensity based on the calculated remaining charge of the battery 47 and the electric milage of the vehicle (moving body) 10.

Furthermore, the calculator 65 calculates the remaining charge of the battery 47 after the enjoying of the adjusted VR service based on the information on the adjusted power consumption and the information on the state of charge of the battery 47 before the enjoying of the VR service, and calculates the travelable distance of the moving body after the enjoying of the adjusted VR service based on the calculated remaining charge of the battery 47 and the electric milage of the moving body.

The calculation results of the calculator 65 are sent to the determiner 63 and the VR controller 67 as necessary.

The VR controller 67 basically performs drive control of the multiple SUS actuators 54 independently in normal traveling of the vehicle 10.

Moreover, the VR controller 67 performs drive control of the SUS actuators 54 according to production of the VR contents in the enjoying of the VR service according to the VR contents.

Moreover, the VR controller 67 presents the operation management information relating to the remaining charge of the battery 47 and the travelable distance after the enjoying of the VR service on the LCD (information presenter) 35 prior to the enjoying of the VR service according to the VR contents.

Furthermore, the VR controller 67 presents the operation management information relating to the remaining charge of the battery 47 and the travelable distance after the enjoying of the adjusted VR service for each of the multiple levels of production intensity on the LCD (information presenter) 35 in a form of a list (see FIGS. 5B and 5C) prior to the enjoying of the adjusted VR service for each of the multiple levels of production intensity.

The BRK-ECU 53 belongs to the output-system elements 15 like the VR-ECU 51. The BRK-ECU 53 uses drive of a brake motor to cause a motor cylinder device (for example, see JP2015-110378A: not shown) to operate depending on a level of a braking fluid pressure (primary liquid pressure) generated in a master cylinder (not shown) by a braking operation of a driver, and thereby generates a braking fluid pressure (secondary liquid pressure) used to apply braking force to the vehicle 10.

The MTR-ECU 55 belongs to the output-system elements 15 like the VR-ECU 51 and the BRK-ECU 53. The MTR-ECU 55 performs drive control of the drive motor based on information relating to an acceleration operation (step-in amount of an accelerator pedal) of the driver and the like.

The PWR-ECU 57 calculates total requested power which the battery system 39 is requested to output, based on, for example, the current vehicle speed of the vehicle 10, an accelerator opening degree, a brake step-in amount, and the like. For example, the PWR-ECU 57 calculates the total requested power by calculating a requested torque to be outputted by the drive motor based on the current vehicle speed of the vehicle 10 and the accelerator opening degree and adding up accessory requested power requested by accessories and drive shaft requested power obtained based on the requested torque and the rotation speed of the drive motor.

The BTR-ECU 59 manages a charge status (power storage status) of the battery 47. For example, the BTR-ECU 59 calculates the state of charge (SOC) of the battery 47 based on the BTR state information outputted by the state sensor 49. The calculation result of SOC is sent to the VR-ECU 51, the PWR-ECU 57, and the like.

The AV device 52 includes a display device, an audio device, an AV reproduction device (all devices are not shown), and the like. The AV device 52 is driven by the VR control function of the VR-ECU 51 in the enjoying of the VR service according to the VR contents.

The SUS actuators 54 are provided in the respective suspension devices 19a, 19b, 19c, and 19d (see FIG. 2) provided for the respective wheels of the vehicle 10. Each of the multiple SUS actuators 54 is provided parallel to a spring member (not shown) provided between a sprung member (vehicle body) (not shown) of the vehicle 10 and an upsprung member (wheel or the like to which a tire is fitted) (not shown).

The SUS actuators 54 have a role as virtual dampers that cushion stretching force of the spring members in traveling of the vehicle 10. Meanwhile, in a scene in which the occupant enjoys the VR service with the vehicle 10 used as a motion platform, the SUS actuators 54 have a role of providing realistic sensations to the occupant in the virtual space.

The air conditioner 56 has a function of adjusting atmospheric temperature in the vehicle cabin. The air conditioner 56 is driven by the VR control function of the VR-ECU 51 in the enjoying of the VR service according to the VR contents.

The parking brake (PB) actuator 71 has a function of driving the PB provided in the vehicle 10. The PB actuator 71 is turned on and driven by the VR control function of the VR-ECU 51 when the occupant performs an operation of turning on the VR mode switch 37.

The door lock (DR) actuator 73 has a function of driving a DR provided in the vehicle 10. The DR actuator 73 is turned on and driven (locks the doors) by the VR control function of the VR-ECU 51 when the occupant performs the operation of turning on the VR mode switch 37.

The communication device 75 is used, for example, when necessary data and information are obtained from the outside of the vehicle 10.

[Operations of Virtual Space Production Apparatus 11 also Serving as Operation Management Apparatus 12 of Moving Body According to Embodiment]

Figure 4:
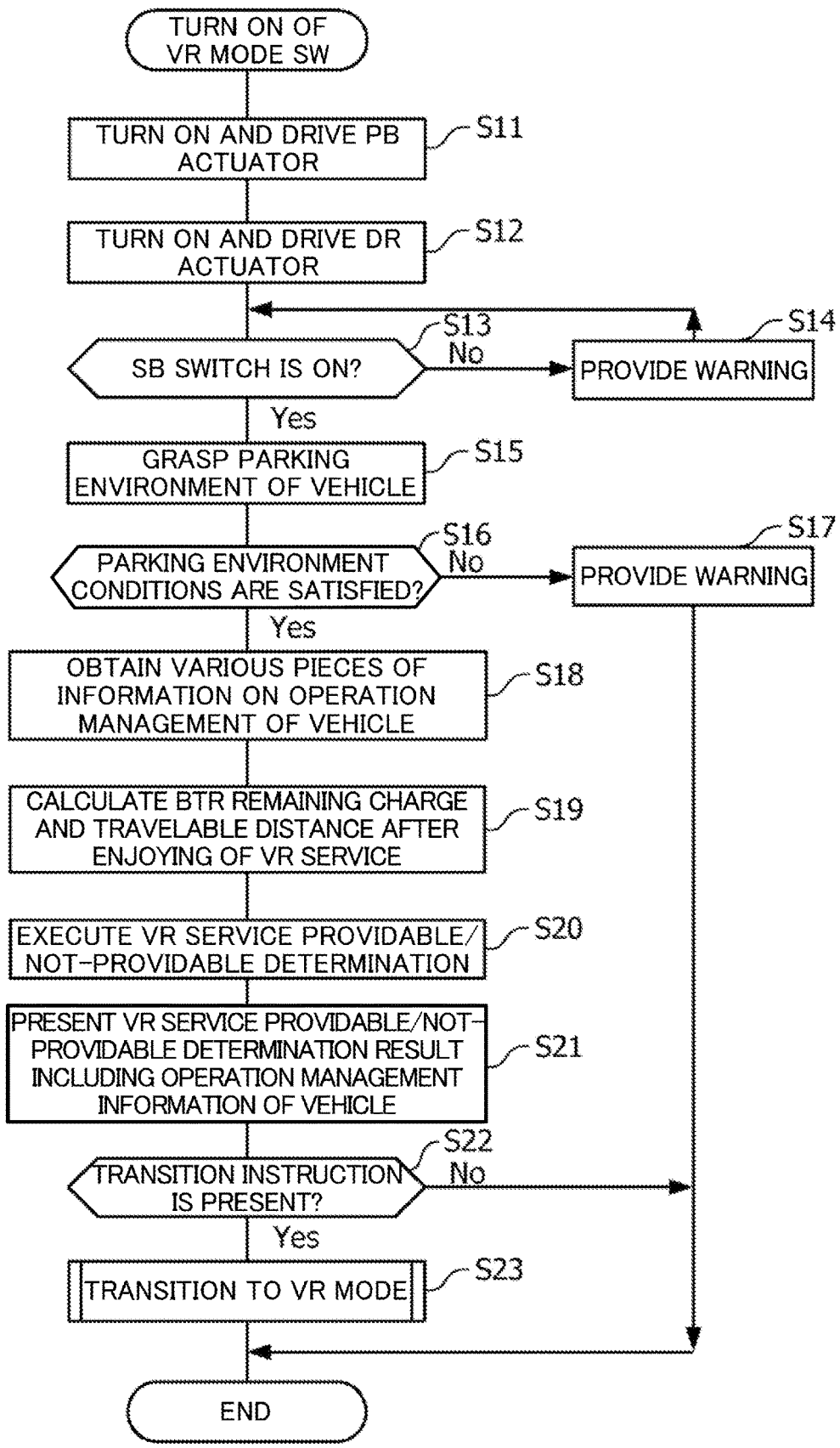
FIG. 4 is a flowchart used to explain operations of the virtual space production apparatus also serving as the operation management apparatus of the moving body.

Next, operations of the virtual space production apparatus 11 also serving as the operation management apparatus 12 of the moving body according to the embodiment are described with reference to FIGS. 3A, 3B, 4, and 5A to 5C as appropriate. FIG. 4 is a flowchart used to explain the operations of the virtual space production apparatus 11 also serving as the operation management apparatus 12 of the moving body. FIG. 5A is a diagram showing an example of an output ratio associated with each of the multiple levels of production intensity set in the operation management apparatus 12 of the moving body. FIG. 5B is a diagram used to explain a presentation form relating to the operation management information for each of the multiple levels of production intensity, the operation management information presented in a form of a list prior to the enjoying of the VR service according to the VR contents (movie or the like). FIG. 5C is a diagram used to explain a presentation form relating to the operation management information for each of the multiple levels of production intensity, the operation management information presented in a form of a list prior to the enjoying of the VR service according to the VR contents (game or the like).

It is assumed that the vehicle 10 is in a stopped state on a gently-tilted road (see FIG. 3A), the passerby (object) 60 is absent in the monitoring region 62 set in the periphery of the vehicle 10 (see FIG. 3B), and the occupant has performed the operation of turning on the VR mode switch 37.

In steps S11 to S12 shown in FIG. 4, the VR-ECU 51 turns on and drives the PB actuator 71 and the DR actuator 73. This maintains the parked state of the vehicle 10 and locks the doors.

In step S13, the VR-ECU 51 checks whether the seatbelt (SB) switch is on, that is whether the occupant is in a restrained state by fastening the seatbelt.

When the VR-ECU 51 determines that the occupant is not in the restrained state by fastening the seatbelt as a result of the check in step S13 (No in step S13), the VR-ECU 51 causes the flow of processes to proceed to subsequent step S14.

Meanwhile, when the VR-ECU 51 determines that the occupant is in the restrained state by fastening the seatbelt as a result of the check in step S13 (Yes in step S13), the VR-ECU 51 causes the flow of processes to jump to step S15.

In step S14, the VR-ECU 51 provides a warning prompting the occupant to fasten the seatbelt, by using the LCD (information presenter) 35. Thereafter, the VR-ECU 51 causes the flow of processes to return to step S13, and performs the subsequent processes.

In step S15, the information obtainer 61 of the VR-ECU 51 grasps the parking attitude of the vehicle 10 based on the tilt information relating to the tilt angle of the vehicle 10 and detected by the tilt angle sensor 29 and the monitoring information including presence or absence of the passerby (object) 60 in the monitoring region 62 and outputted by the periphery monitoring device 21.

In step S16, the determiner 63 of the VR-ECU 51 determines whether predetermined parking environment conditions are satisfied based on a parking environment of the vehicle 10 grasped by the information obtainer 61. The tilt angle TA of the vehicle 10 not exceeding the first tilt angle threshold TAth1 (TA≤TAth1) and the absence of the passerby (object) 60 in the monitoring region 62 of the vehicle 10 may be employed as the predetermined parking environment conditions.

Employing the satisfaction of the above parking environment conditions in the transition to the VR mode can avoid in advance the following risks even if the vehicle 10 moves violently during the enjoying of the VR service: a risk of the vehicle 10 moving and sliding down the tilted road with the violent movement; and a risk of the vehicle 10 coming into contact with the passerby (object) 60. As a result, the enjoying of the VR service in a safe and secure parking environment can be guaranteed.

When the determiner 63 determines that the parking environment conditions are not satisfied as a result of the determination in step S16 (No in step S16), the VR-ECU 51 assumes that the enjoying of the VR service in a safe and secure parking environment cannot be guaranteed if the transition to the VR mode is allowed, and causes the flow of processes to proceed to subsequent step S17.

Meanwhile, when the determiner 63 determines that the parking environment conditions are satisfied as a result of the determination in step S16 (Yes in step S16), the VR-ECU 51 assumes that the enjoying of the VR service in a safe and secure parking environment can be guaranteed if the transition to the VR mode is allowed, and causes the flow of processes to jump to step S18.

In step S17, the VR-ECU 51 provides a warning indicating that enjoying of a safe and secure VR service cannot be guaranteed in a current parking environment, by using the LCD (information presenter) 35. Thereafter, the VR-ECU 51 terminates the flow of the series of processes.

In step S18, the information obtainer 61 of the VR-ECU 51 obtains the various pieces of information on the operation management of the vehicle 10.

Specifically, the information obtainer 61 of the VR-ECU 51 obtains the information on the power consumption to be consumed with the enjoying of the VR service according to the VR contents (see "power consumption amount (in terms of SOC) with enjoying of VR service" in FIG. 5B and "average power consumption amount (in terms of SOC) per unit time" in FIG. 5C), the information on the state of charge of the battery 47 before the enjoying of the VR service (see "SOC before enjoying" in FIG. 5B and "SOC before playing" in FIG. 5C), and the information on the electric milage of the vehicle (moving body) 10 (see "average travel distance per unit SOC" in each of FIGS. 5B and 5C).

Moreover, the information obtainer 61 of the VR-ECU 51 obtains the setting information of the production intensity relating to the drive range that is the setting width of the drive force of the SUS actuators 54 (see FIG. 5A) and the information on the adjusted power consumption to be consumed in the enjoying of the adjusted VR service in which the drive range of the SUS actuators 54 is adjusted by applying the drive range based on the setting information of the production intensity (see "power consumption amount (in terms of SOC) with enjoying of VR service" in FIG. 5B and "average power consumption amount (in terms of SOC) per unit time" in FIG. 5C).

In step S19, the calculator 65 of the VR-ECU 51 calculates (see following Formula 1) the remaining charge of the battery 47 (BTR remaining charge) after the enjoying of the VR service based on the information on the power consumption to be consumed with the enjoying of the VR service according to the VR contents and the information on the state of charge of the battery 47 before the enjoying of the VR service among the pieces of information on the operation management of the vehicle 10 obtained by the information obtainer 61, and calculates (see following Formula 2) the travelable distance of the vehicle 10 after the enjoying of the VR service based on the calculated BTR remaining charge and the electric milage of the vehicle 10.

BTR remaining charge=state of charge of battery 47 before enjoying of VR service-power consumption to be consumed with enjoying of VR service (Formula 1)

Travelable distance of vehicle 10 after enjoying of VR service=BTR remaining charge*electric milage of vehicle 10 (Formula 2)

Note that, when the power consumption to be consumed with the enjoying of the VR service is to be directly supplied from a power supply facility (not shown) connected to the moving body to the virtual space production apparatus 11 also serving as the operation management apparatus 12 of the moving body (without via the battery 47), the BTR remaining charge is expressed as in following (Formula 3).

BTR remaining charge=state of charge of battery 47 before enjoying of VR service (Formula 3)

In step S20, the determiner 63 of the VR-ECU 51 determines whether the vehicle 10 can complete the expected travel distance (of the vehicle 10 after the enjoying of the VR service) set in advance, based on the travelable distance of the vehicle 10 after the enjoying of the VR service calculated by the calculator 65 and the expected travel distance.

When the travelable distance of the vehicle 10 after the enjoying of the VR service is larger than the expected travel distance (travelable distance>expected travel distance), the determiner 63 determines that the vehicle 10 can complete the expected travel distance based on a magnitude relationship between the travelable distance and the expected travel distance.

The VR service providable/not-providable determination result determined by the determiner 63 is sent to the VR controller 67.

In step S21, the VR controller 67 of the VR-ECU 51 presents the VR service providable/not-providable determination result including the operation management information of the vehicle 10 relating to the remaining charge of the battery 47 and the travelable distance after the enjoying of the VR service, in a form of a list on the LCD (information presenter) 35 prior to the enjoying of the VR service according to the VR contents.

For example, it is useful if the VR service can be enjoyed in a power-saving mode in the case where the state of charge of the battery 47 mounted in the vehicle 10 is insufficient. Meanwhile, the usability for the user is improved if the VR service can be enjoyed in an enhanced mode in the case where the state of charge of the battery 47 is sufficient.

Based on such a viewpoint, as shown in FIG. 5A, the setting information of the production intensity relating to the drive range that is the setting width of the drive force of the SUS actuators 54 is stored in advance in a memory such as the RAM included in the VR-ECU 51. In the example shown in FIG. 5A, three levels of production intensity (soft/normal/hard) are prepared. For the three levels of production intensity, an output ratio (1.3) is associated with the production intensity (hard), an output ratio (1.0) is associated with the production intensity (normal), and an output ratio (0.7) is associated with the production intensity (soft). Note that the values of the output ratios associated with the respective three levels of production intensity can be changed as appropriate.

According to the example shown in FIG. 5A, when the VR service is enjoyed with the production intensity (normal) selected, the VR service is provided with a standard production effect to which a standard drive range (output ratio: 1.0) of the SUS actuators 54 is applied.

Moreover, when the VR service is enjoyed with the production intensity (soft) selected, the VR service is provided with a modest production effect to which a drive range (output ratio: 0.7) of the SUS actuators 54 with a smaller dynamic range than that in the production intensity (normal) is applied.

Furthermore, when the VR service is enjoyed with the production intensity (hard) selected, the VR service is provided with a powerful production effect to which a drive range (output ratio: 1.3) of the SUS actuators 54 with a larger dynamic range than that in the production intensity (normal) is applied.

Such VR contents are roughly divided into contents belonging to a first group whose standard service time is defined such as a movie or a music concert and contents belonging to a second group whose standard service time is not defined such as a game.

If information that allows appropriate operation management of the vehicle 10 can be presented prior to the enjoying of the VR service according to the VR contents irrespective of such attributes of the VR contents, the usability for the user is improved.

Based on such a viewpoint, when the occupant is to enjoy the VR service according to the VR contents (for example, a movie) belonging to the first group, as shown in FIG. 5B, the operation management information on standard service time (90 minutes), the SOC (55%) of the battery 47 before the enjoying of the VR service, an average traveling distance per unit SOC (2 km/%), and the expected travel distance (35 km) after the enjoying of the VR service is presented prior to the enjoying of this VR service. Meanwhile, as the operation management information for each of the three levels of production intensity (soft/normal/hard), pieces of information on the power consumption amount (in terms of SOC) with the enjoying of the VR service (soft: 31.5%/ normal: 45.0%/hard: 58.5%), the SOC of the battery 47 after the enjoying of the VR service (soft: 23.5%/normal: 10.0%/ hard: −3.5%), the travelable distance after the enjoying of the VR service (soft: 47 km/normal: 20 km/hard: 0 km), and the VR service providable/not-providable determination result (soft: providable/normal: not providable/hard: not providable) are presented in a form of a list.

The user having acquired the operation management information as shown in FIG. 5B prior to the enjoying of the VR service according to the VR contents (for example, a movie) belonging to the first group determines whether to enjoy the VR service by selecting the production intensity (soft) or to give up enjoying the VR service.

Meanwhile, when the occupant is to enjoy the VR service according to the VR contents (for example, a game) belonging to the second group, as shown in FIG. 5C, the operation management information on expected play time (30 minutes), the SOC (55%) of the battery 47 before the enjoying of the VR service, the average traveling distance per unit SOC (2 km/%), and the expected travel distance (75 km) after the enjoying of the VR service is presented prior to the enjoying of this VR service. Meanwhile, as the operation management information for each of the three levels of production intensity (soft/normal/hard), pieces of information on the average power consumption amount (in terms of SOC) per unit time with the enjoying of the VR service (soft: 0.35% per minute/normal: 0.5% per minute/hard: 0.65% per minute), an expected power consumption amount (in terms of SOC) with the enjoying of the VR service (soft: 10.5%/ normal: 15.0%/hard: 19.5%), the SOC of the battery 47 after the enjoying of the VR service (soft: 44.5%/normal: 40.0%/ hard: 35.5%), the travelable distance after the enjoying of the VR service (soft: 89 km/normal: 80 km/hard: 71 km), and the VR service providable/not-providable determination result (soft: providable/normal: providable/hard: not providable) are presented in a form of a list.

The user having acquired the operation management information as shown in FIG. 5C prior to the enjoying of the VR service according to the VR contents (for example, a game) belonging to the second group determines whether to enjoy the VR service by selecting the production intensity (soft) or (normal) or to give up enjoying the VR service.

In step S22, the VR-ECU 51 checks whether a transition instruction to the VR mode is present.

When the VR-ECU 51 determines that the transition instruction to the VR mode is absent (the user has given up the enjoying of the VR service) as a result of the determination in step S22 (No in step S22), the VR-ECU 51 cancels the transition to the VR mode, and terminates the flow of the series of processes.

Meanwhile, when the VR-ECU 51 determines that the transition instruction to the VR mode with a selection operation for one (for example, soft) of the multiple levels of production intensity (soft/normal/hard) is present as a result of the determination in step S22 (Yes in step S22), the VR controller 67 of the VR-ECU 51 performs the drive control of the AV device 52 and the SUS actuators 54 by using the selected production intensity (soft) to allow the user to enjoy the VR service according to the VR contents. After the enjoying of the VR service is completed, the VR-ECU 51 terminates the flow of the series of processes.

According to the operation management apparatus 12 of the moving body according to the embodiment of the present invention, the operation management information relating to the remaining charge of the battery 47 and the travelable distance after the enjoying of the VR service is presented on the LCD (information presenter) 35 prior to the enjoying of the VR service according to the VR contents. Accordingly, when the occupant enjoys the VR service according to the VR contents in the moving body such as the vehicle 10, the situation where the moving body becomes unmovable at the site where the VR service is enjoyed can be avoided in advance, and appropriate operation management of the moving body can be guaranteed in terms of this point.

Moreover, the information on the VR service providable/ not-providable determination result is presented on the LCD (information presenter) 35 in a form of a list together with the operation management information relating to the remaining charge of the battery 47 and the travelable distance after the enjoying of the VR service, prior to the enjoying of the VR service according to the VR contents, irrespective of whether the VR contents belongs to the first group or the second group. Accordingly, information presentation suiting a request for enjoying the VR service made by the user is possible in addition to the operation and effect of guaranteeing the appropriate operation management of the moving body. As a result, this can contribute to an improvement in the usability for the user.

Other Embodiments

The embodiment described above describe a specific example of the present invention. Accordingly, the technical scope of the present invention should not be interpreted to be limited by these embodiments. This is because the present invention can be carried out in various modes without departing from the gist or the main feature of the present invention.

For example, although the embodiment of the present invention is described by giving the electric vehicle configured to travel by using the electric power of the chargeable and dischargeable battery 47 as the power source as an example of the moving body according to the present invention, the present invention is not limited to this example. The moving body according to the present invention may be a hybrid type vehicle that uses drive force of a drive motor and drive force of an internal combustion engine while switching between the two as appropriate.

Although the embodiment of the present invention is described by giving the three levels of production intensity (soft/normal/hard) as an example of the setting information of the production intensity relating to the drive range that is the setting width of the drive force of the SUS actuators 54, the present invention is not limited to this example. In the setting information of the production intensity, the number of levels of production intensity can be changed as appropriate as long as multiple levels of production intensity are set.

Moreover, although the embodiment of the present invention is described by giving the SUS actuators 54 as an example of the production intensity setting target device, the present invention is not limited to this example. The AV device 52 and the air conditioner 56 may be employed instead of or in addition to the SUS actuators 54 as the production intensity setting target device.

Furthermore, although the embodiment of the present invention is described by giving, as an example, the mode in which the operation control according to the present invention is performed by using the VR-ECU 51 that functions independently of the other ECUs, the present invention is not limited to this example. A mode in which the operation control according to the present invention is performed by using an integrated ECU in which multiple functions are integrated may be employed.

Moreover, there may be employed a configuration in which, when the operation control according to the present invention is performed by using the integrated ECU, software that can execute the operation control according to the present invention and that is stored in an external server (not shown) is downloaded to a memory included in the integrated ECU via the communication device 75, and is executed to perform the operation control according to the present invention by using the integrated ECU.

What is claimed is:

1. An operation management apparatus of a moving body including a virtual space production apparatus including an audio visual (AV) device configured to present AV information to an occupant of the moving body, an actuator configured to generate load relating to vibration of the moving body, and a controller configured to control the AV device and the actuator, the virtual space production apparatus configured to produce a simulated experience for the occupant in a virtual space by driving the AV device and the actuator when a virtual reality (VR) service according to VR contents is enjoyed by using the moving body in a stopped state, the moving body configured to use electric power of a chargeable and dischargeable battery as a power source, the operation management apparatus comprising:

an information obtainer configured to obtain information on power consumption to be consumed with the enjoying of the VR service according to the VR contents, information on a state of charge of the battery before the enjoying of the VR service, and information on an electric milage of the moving body; and a calculator configured to calculate a remaining charge of the battery after the enjoying of the VR service based on the information on the power consumption to be consumed with the enjoying of the VR service and the information on the state of charge of the battery before the enjoying of the VR service and to calculate a travelable distance of the moving body after the enjoying of the VR service based on the calculated remaining charge of the battery and the electric milage of the moving body, wherein the controller presents operation management information relating to the remaining charge of the battery and the travelable distance after the enjoying of the VR service, on an information presenter prior to the enjoying of the VR service.

2. The operation management apparatus of the moving body according to claim 1, wherein the information obtainer further obtains setting information of a production intensity relating to a drive range of the actuator and information on adjusted power consumption to be consumed with enjoying of an adjusted VR service that is the VR service in which the drive range of the actuator is adjusted by applying a drive range based on the setting information of the production intensity, the calculator calculates the remaining charge of the battery after the enjoying of the adjusted VR service based on the information on the adjusted power consumption and the information on the state of charge of the battery before the enjoying of the adjusted VR service, and calculates the travelable distance of the moving body after the enjoying of the adjusted VR service based on the calculated remaining charge of the battery and the electric milage of the moving body, and the controller presents the operation management information relating to the remaining charge of the battery and the travelable distance after the enjoying of the adjusted VR service, on the information presenter prior to the enjoying of the adjusted VR service.

3. The operation management apparatus of the moving body according to claim 2, wherein the information obtainer obtains the setting information of the production intensity relating to the drive range of the actuator for each of a plurality of levels of the production intensity and the information on the adjusted power consumption for each of the plurality of levels of the production intensity, the calculator calculates the remaining charge of the battery after the enjoying of the adjusted VR service for each of the plurality of levels of the production intensity based on the information on the adjusted power consumption for the each of the plurality of levels of the production intensity and the information on the state of charge of the battery before the enjoying of the adjusted VR service, and calculates the travelable distance of the moving body after the enjoying of the adjusted VR service for each of the plurality of levels of the production intensity based on the calculated remaining charge of the battery and the electric milage of the moving body, and the controller presents the operation management information relating to the remaining charge of the battery and the travelable distance after the enjoying of the adjusted VR service for each of the plurality of levels of the production intensity, in a form of a list on the information presenter prior to the enjoying of the adjusted VR service.

4. An operation management apparatus of a moving body including a virtual space production apparatus including an audio visual (AV) device configured to present AV information to an occupant of the moving body, an actuator configured to generate load relating to vibration of the moving body, and a controller configured to control the AV device and the actuator, the virtual space production apparatus configured to produce a simulated experience for the occupant in a virtual space by driving the AV device and the actuator when a virtual reality (VR) service according to VR contents is enjoyed by using the moving body in a stopped state, the moving body configured to use electric power of a chargeable and dischargeable battery as a power source, the operation management apparatus comprising:

an information obtainer configured to obtain setting information of a production intensity relating to a drive range of the actuator, information on adjusted power consumption to be consumed with enjoying of an adjusted VR service that is the VR service in which the drive range of the actuator is adjusted by applying a drive range based on the setting information of the production intensity, information on a state of charge of the battery before the enjoying of the adjusted VR service, and information on an electric milage of the moving body; and a calculator configured to calculate a remaining charge of the battery after the enjoying of the adjusted VR service based on the information on the adjusted power consumption and the information on the state of charge of the battery before the enjoying of the adjusted VR service and to calculate a travelable distance of the moving body after the enjoying of the adjusted VR service based on the calculated remaining charge of the battery and the electric milage of the moving body, wherein the information obtainer further obtains setting information of an expected travel distance of the moving body, the operation management apparatus further comprising a determiner configured to determine whether the moving body is capable of completing the expected travel distance based on the calculated travelable distance and the expected travel distance, wherein the controller presents a determination result of the determiner together with operation management information relating to the remaining charge of the battery and the travelable distance after the enjoying of the adjusted VR service, on an information presenter prior to the enjoying of the adjusted VR service.

* * * * *